(12) United States Patent
Wang

(10) Patent No.: US 9,550,540 B1
(45) Date of Patent: Jan. 24, 2017

(54) FOLDABLE VEHICLE FOR CARRYING A GOLF BAG

(71) Applicant: Yaguang Wang, Northbrook, IL (US)

(72) Inventor: Yaguang Wang, Northbrook, IL (US)

( * ) Notice: Subject to any disclaimer, the term of this patent is extended or adjusted under 35 U.S.C. 154(b) by 0 days.

(21) Appl. No.: 14/832,868

(22) Filed: Aug. 21, 2015

(51) Int. Cl.
*B62J 11/00* (2006.01)
*B62K 15/00* (2006.01)

(52) U.S. Cl.
CPC ............. *B62J 11/00* (2013.01); *B62K 15/006* (2013.01)

(58) Field of Classification Search
CPC .......... B62J 11/00; B62K 15/006; B62K 9/02; B62K 5/02
USPC ........................ 280/270, 278, 287, 202, 282, 87.041, 280/87.05
See application file for complete search history.

(56) References Cited

U.S. PATENT DOCUMENTS

| | | | | |
|---|---|---|---|---|
| 3,753,577 A * | 8/1973 | Robinson | ................. | B62K 5/02 280/261 |
| 4,538,695 A | 9/1985 | Bradt | | |
| 4,573,549 A * | 3/1986 | Pankow | ................. | B62D 61/08 180/216 |
| 4,802,547 A | 2/1989 | Nakasaki | | |
| 4,861,058 A * | 8/1989 | Cresswell | .............. | A61G 5/042 180/13 |
| 5,277,267 A | 1/1994 | Tiffany | | |
| 5,328,193 A * | 7/1994 | Shiew | .................... | B62K 3/002 280/62 |
| 5,468,006 A * | 11/1995 | Delserro | ................. | B62J 11/00 280/202 |
| 5,941,548 A * | 8/1999 | Owsen | ..................... | B62K 5/10 280/266 |
| 6,367,824 B1 * | 4/2002 | Hayashi | .................... | B62K 5/05 280/124.103 |
| 7,621,548 B2 | 11/2009 | Weber | | |
| 7,631,715 B2 | 12/2009 | Falkiner | | |
| 8,162,339 B2 * | 4/2012 | James | ..................... | B62K 3/005 280/231 |
| 8,573,338 B2 | 11/2013 | Gal et al. | | |
| 9,061,724 B2 * | 6/2015 | James | ...................... | B62M 1/36 |
| 2011/0031716 A1 * | 2/2011 | Taylor | ..................... | B62K 5/05 280/259 |

FOREIGN PATENT DOCUMENTS

CN 103523132 A 1/2014

OTHER PUBLICATIONS

Webpage at www.thegolfbike.com/design, printed Oct. 5, 2015.
(Continued)

*Primary Examiner* — Kevin Hurley
*Assistant Examiner* — Marlon A Arce
(74) *Attorney, Agent, or Firm* — Richards Patent Law P.C.

(57) ABSTRACT

A passenger vehicle for carrying a golf bag includes first and second front wheels and a rear wheel, a frame that may be folded into a compact position, gearing, and a steering mechanism. The frame includes a cross bar extending between the first and second front wheels, first and second front bars connected to a rear bar at a hinged connection, and a down tube connected to the cross bar, wherein the rear bar includes a receiving mechanism for releaseably receiving the down tube. The gearing includes a cassette secured to an axle extending through the cross bar. A steering mechanism for providing directionality includes a steering member within the rear bar. A first golf bag support is connected to the first and second front bars and a second golf bag support is connected to the cross bar.

18 Claims, 4 Drawing Sheets

(56) References Cited

OTHER PUBLICATIONS

Webpage at http://www.blessthisstuff.com/stuff/vehicles/cycles/kiffy-folding-tricycle/, printed Oct. 5, 2015.
Webpage at https://web.archive.org/web/20150813225645/http://diblasi.it/Folding_Tricycles.asp?Prd=Tricycles&Pag=Gruppo&Lng=it, published Aug. 13, 2015, printed Oct. 5, 2015.

* cited by examiner

FOLDABLE VEHICLE FOR CARRYING A GOLF BAG

BACKGROUND OF THE INVENTION

The present subject matter relates generally to passenger vehicles for carrying golf clubs. Specifically, the present subject matter provides a front-wheel drive, rear-wheel steering passenger vehicle configured to move between an active position and a compact position embodied in a folding tricycle design.

When golfing, a player will typically either walk or ride a golf cart between shots and between holes. Walking the course requires the golfer to carry the golf bag or push the golf bag in a pushcart. With a typical golf bag loaded with clubs and balls weighing in between 15-25 lbs. and the distance a golfer walks during a round of golf usually exceeding 5 miles and taking up to four hours, carrying the golf bag can be tiring and uncomfortable, which can affect the golfer's performance. Using a pushcart may be awkward and cumbersome (e.g., it can be difficult to push uphill, difficult to restrain downhill, tip over on a sidehill, etc.), and while relieving the burden of carrying the bag, it may still be difficult to push around the course. Using a golf cart adds an expense for the golf cart rental, and can be inconvenient when two golfers sharing the cart hit the golf balls in different directions, making the golfers zigzag across the course to get the balls. Moreover, while walking the course and carrying the bag may be too much exercise for some golfers, particularly during the hottest summer rounds, many golfers would still enjoy getting more exercise during their round of golf than they would riding in a powered golf cart.

Accordingly, many golfers would enjoy the benefits of having individual transportation that relieves the burden of carrying the clubs, provides some exercise, and is convenient to transport to and from the course. Therefore, there is a need for a vehicle for carrying a golf bag that provides exercise and is conveniently transported to and from the golf course.

BRIEF SUMMARY OF THE INVENTION

The present invention solves the above-mentioned problems by providing an individual passenger-driven vehicle that is moveable between an active position for carrying a golf bag on the golf course and a compact position that can be easily placed in a car trunk or back seat during transportation to and from the course.

In a primary example, the vehicle is a user-powered, folding tricycle including a mechanism for securing the golf bag in place on the frame. In other examples, the vehicle may be gas or electric powered. In a preferred embodiment, the vehicle includes first and second front wheels and a single rear wheel positioned on a frame. Gearing causes the first and second wheels to rotate (pedal powered or engine powered), while the vehicle is steered by a steering mechanism that controls the rear wheel. A user may store and transport the vehicle to the golf course while the vehicle is in the compact position. After unfolding the vehicle into the active position, the user may position the golf bag on the vehicle and pedal the vehicle about the golf course as desired. Based on the configuration described and illustrated herein, the frame is stable during use while remaining easy to fold into the compact position for storage and transportation to and from the course.

An advantage of the present invention is that it provides a unique and enjoyable way for a golfer to get around a golf course, without the burden of walking while carrying clubs and without giving up the exercise the golfer would get walking between shots and holes.

A further advantage of the present invention is that the vehicle folds neatly and conveniently into a compact position for storage and transportation.

Another advantage of the present invention is that use of the vehicle may speed up the pace of the golf game compared to walking the course.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

In order to meet these needs, the present invention discloses a passenger vehicle 100 for carrying items, such as golf clubs 102, which moves between an active position and a compact position.

Figure 4:
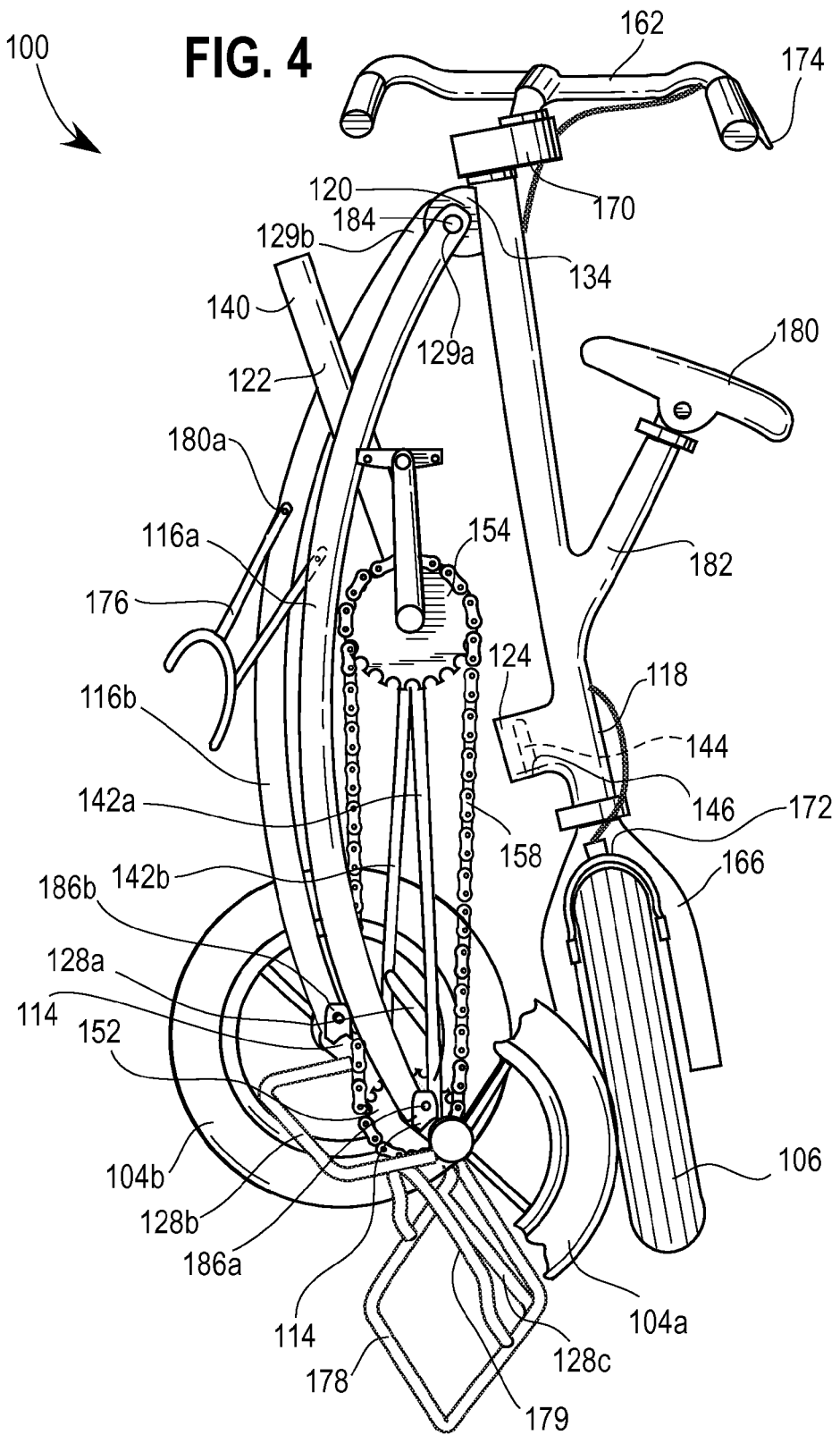
FIG. 4 is a side isometric view of the passenger vehicle of FIG. 1 in a compact position.
Figure 5:
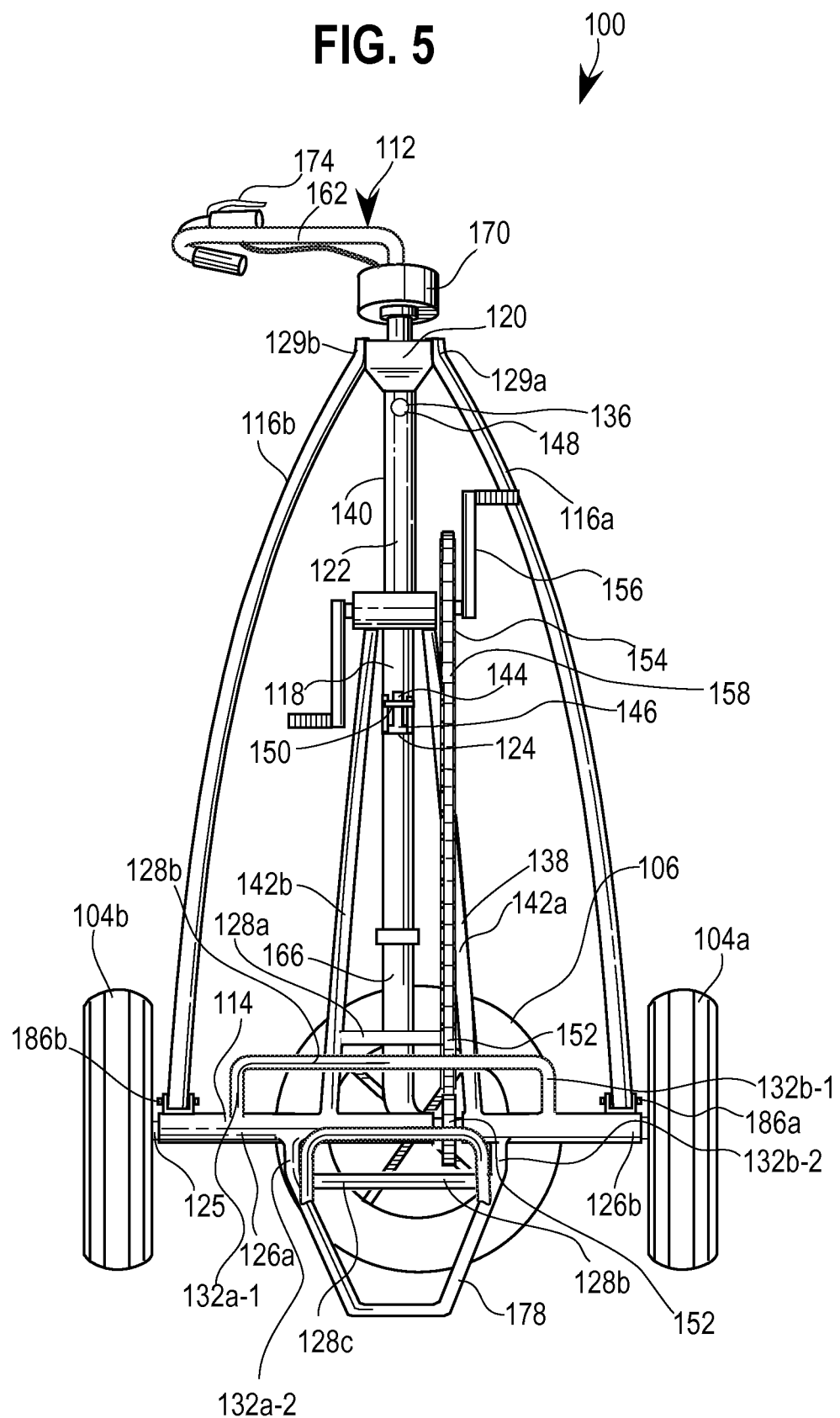
FIG. 5 is a front elevational view of the passenger vehicle of FIG. 1 in the compact position.

In the example illustrated in the Figs., the passenger vehicle 100 is a tricycle including first and second front wheels 104a, 104b and a single rear wheel 106 mounted on a frame 108. Gearing 110 causes the first and second wheels 104a, 104b to rotate, while the vehicle 100 is steered by a steering mechanism 112 that controls the rear wheel 106. In the active state shown in FIGS. 1 and 3, a user can drive the vehicle 100 while carrying items or equipment such as a golf bag 102. When not in use, the frame 108 of the vehicle 100 can be moved into a compact state as shown in FIGS. 4 and 5 for ease of transportation.

Figure 1:
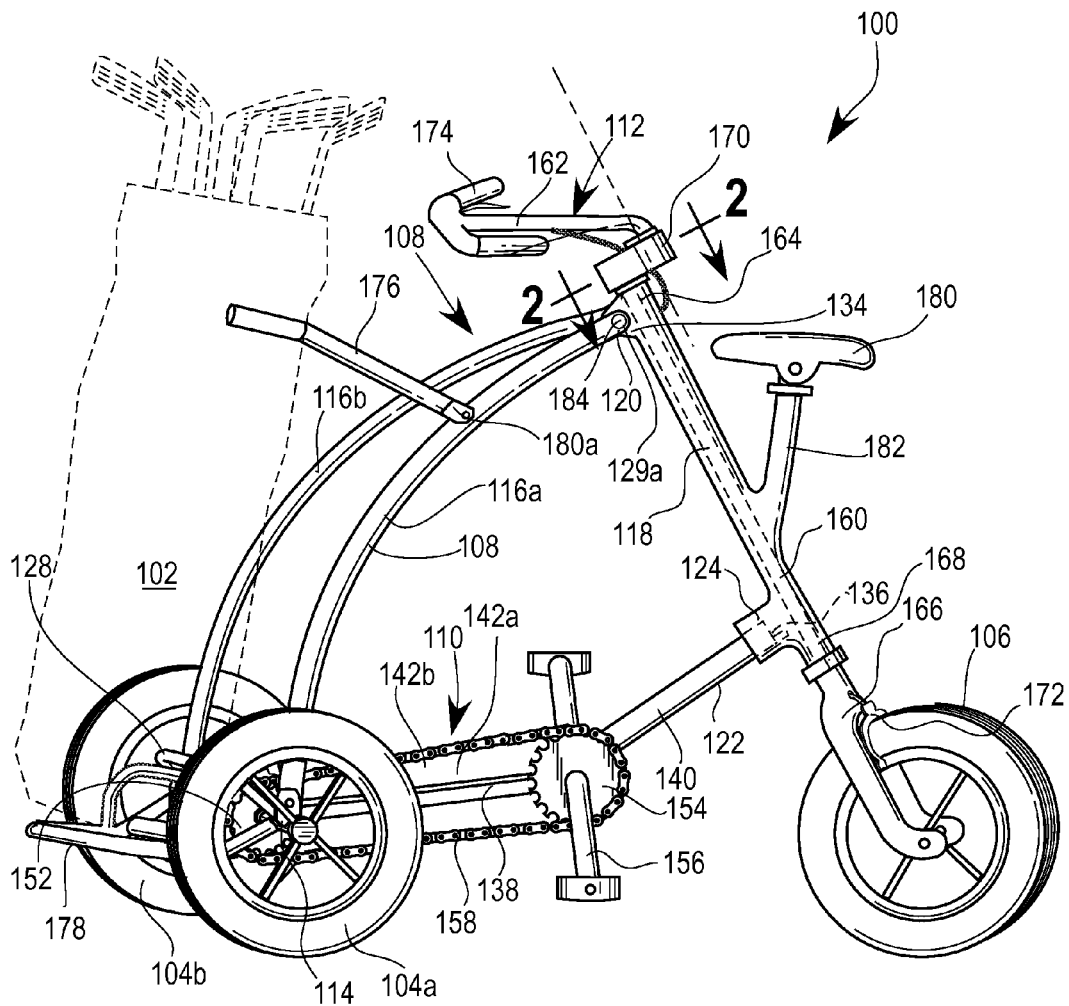
FIG. 1 is an isometric view of an embodiment of a passenger vehicle in an active position.

Referring to FIG. 1, the frame 108 includes a cross bar 114 extending between the first and second front wheels 104a, 104b. First and second front bars 116a, 116b connect to a rear bar 118 at a hinged connection 120. A down tube 122 is fixedly connected to the cross bar 114 and is releasably received by a receiving mechanism 124 extending from the rear bar 118. An axle 125 (shown in FIG. 3A) fixed to the front wheels 104a, 104b rotates within the cross bar 114. The first and second front bars 116a, 116b connect to the cross bar 114 at first and second hinged connections 186a, 186b, respectively.

Figure 3:
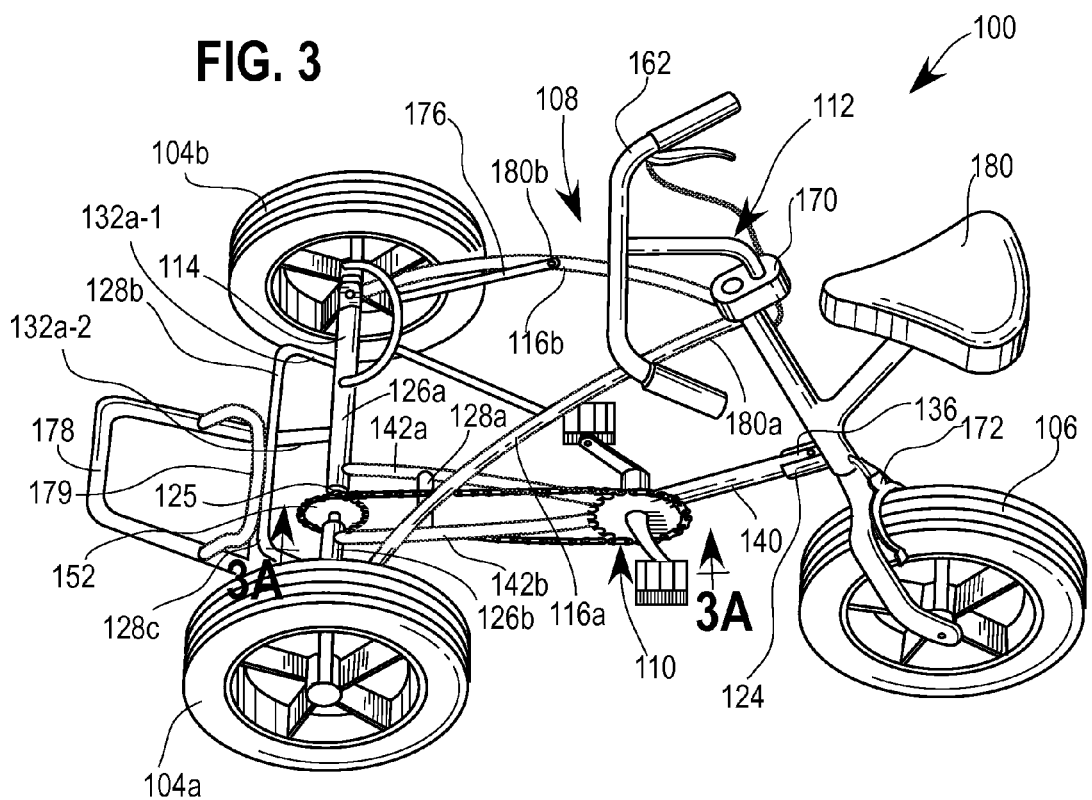
FIG. 3 is a plan view of the passenger vehicle of FIG. 1 in the active position.
Figure 3A:
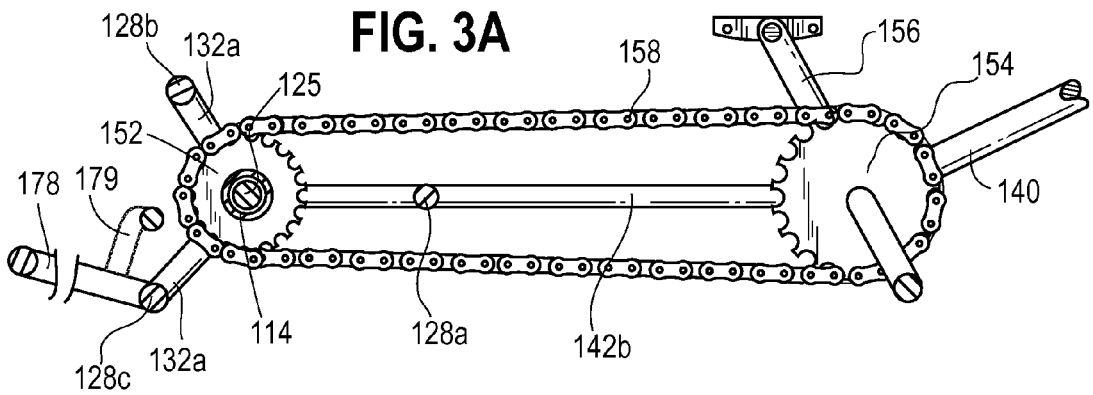
FIG. 3A is a fragmentary, side elevational view of the cross bar of the passenger vehicle taken generally along the lines 3A-3A of FIG. 3.

Referring to FIG. 3, the cross bar 114 includes first and second cross bar portions 126a, 126b that are spaced apart to accommodate the gearing mechanism 110. FIGS. 3 and 3A illustrate a plurality of support members 128 connecting the first and second portions 126a, 126b. In the illustrated example, first, second, and third support members 128a, 128b, 128c extend parallel to the length of the cross bar 114. The first support member 128a extends between first and second members 142a, 142b of the down tube 122. Each of the second and third support members 128b and 128c span between pairs of first and second spacer members 132a-1, 132b-1 and 132a-2, 132b-2, respectively, that extend outwardly from the first and second portions 126a, 126b of the cross bar 114, respectively. The first, second, and third support members 128a, 128b, 128c are rotationally spaced apart from one another about the cross bar 114 by approximately 120 degrees as shown in FIG. 3A. In other embodiments, the number and spacing the support members 128 may vary as desired or necessary. For example, the plurality of support members may include two support members 128 rotationally spaced apart by about 180 degrees.

The first and second front bars 116a, 116b pivot about the hinged connection 120 toward the rear bar 118 when moving from the active position to the compact position. Seen best in FIG. 5, each of the first and second front bars 116a, 116b includes an end 129a, 129b, respectively, opposite the cross bar 114 and having an opening (not shown) therein. The hinged connection 120 may include a single bolt 184 that extends through an opening on a protrusion 134 on the rear bar 118 and the openings in the ends 129a, 129b of the first and second front bars 116a, 116b.

The first and second front bars 116a, 116b pivot about the hinged connections 186a, 186b on the cross bar 114 as the cross bar 114 moves toward the rear bar 118 when moving from the active position to the compact position. As illustrated in FIG. 1, the first and second front bars 116a, 116b may have an arcuate shape. In other embodiments, each of the first and second front bars 116a, 116b may include one or more straight portions connected by a bend.

The down tube 122 is fixedly connected to the cross bar 114 and includes an end 136 that is received by the receiving mechanism 124 in the active position shown in FIG. 1 and is spaced from the receiving mechanism 124 in the compact position shown in FIG. 4. In the illustrated embodiment, the down tube 122 and the cross bar 114 are formed as a single piece. The down tube 122 may include a first down tube portion 138 adjacent the cross bar 114 and a second down tube portion 140 distal from the cross bar 114. In one embodiment, the first down tube portion 138 includes first and second members 142a, 142b. In other embodiments, the first down tube portion 138 may include a single member or more than two members. The first and second down tube portions 138, 140 may be disposed at an angle relative to one another. The first down tube portion 138 may have a diameter that is smaller than a diameter of the second down tube portion 140.

When the receiving mechanism 124 releases the down tube 122 as the vehicle 100 moves from the active state to the compact state, the down tube 122 pivots about the axle 125 towards the first and second front bars 116a, 116b and the first and second front bars 116a, 116b pivot about the hinged connections 186a, 186b of the cross bar 114. In one embodiment, the receiving mechanism 124 includes a rod 144 on a plate 146 extending from the rear tube 118. An opening 148 of the down tube 122 is positioned about the rod 144 of the receiving mechanism 124 in the active position as shown in FIG. 3. The receiving mechanism 124 may include a lock 150 that secures the down tube 122 in the receiving mechanism 124 and prevents the unintentional disconnect of the down tube 122 from the rear tube 118, thereby ensuring that the vehicle 100 is maintained in the active position.

Figure 2:
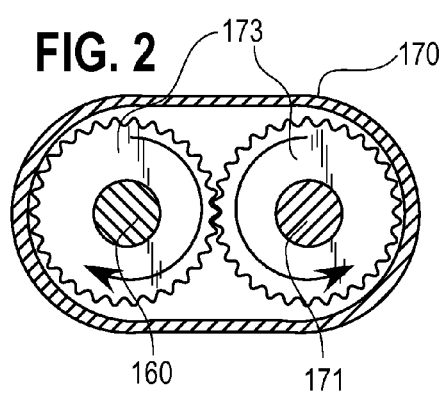
FIG. 2 is a plan view taken generally along the lines 2-2 of FIG. 2.

The gearing mechanism 110 causes the axle 125 of the first and second front wheels 104a, 104b to rotate. As shown in FIG. 2, a cassette 152 is secured to the axle 125 between the first and second portions 126a, 126b of the cross bar 114. A chain wheel 154 including a crank set 156 is secured to the down tube 122. A chain 158 extends between the chain wheel 154 and the cassette 152 such that pedaling of the crank set 156 causes the cassette 152 and the axle 125 to rotate. The cassette 152 may include a single gear or cog or a plurality of gears or cogs. In an alternative embodiment, the gearing mechanism 110 may be motorized, whether gasoline or battery powered.

The steering mechanism 112 secured to the rear wheel 106 provides directionality of the vehicle 100. A steering member 160 is positioned and rotates within the rear bar 118. FIG. 2 illustrates an example embodiment of a reverse gear mechanism 170 attached to a first end 164 of the rear tube 118 adjacent to a handlebar 162. A stem 171 of the handlebar 162 and the steering member 160 are received by gears 173 within the reverse gear mechanism 170 as shown in FIG. 2 such that a rotation input from the handlebar 162 causes a rotation output of the steering member 160 to be a reversed rotation. As a result, use of the reverse gear mechanism 170 allows the handlebar 162 to steer the vehicle 100 like a conventional front-wheel steered bicycle or tricycle. Specifically, in an embodiment without a reverse gear mechanism 170, movement of the handlebar 162 towards the right causes the rear wheel 106 to angle to the right, thereby causing the vehicle 100 to move towards the left. In an embodiment with a reverse gear mechanism 170, movement of the handlebar 162 towards the right causes the rear wheel 106 to angle to the left, thereby causing the vehicle 100 to move towards the right, thereby reversing the directionality of the vehicle 100. In other embodiments, the reverse gear mechanism 170 may include any number of gears, couplers, and other components to cause the directionality of the vehicle 100 to be reversed.

A brake 172 such as a side-pull brake may be mounted to the fork 166 adjacent the rear wheel 106. A brake lever 174 connected to the brake 172 by a cable (not shown) may be mounted to the handlebar 162 as shown in FIG. 1. The illustrated embodiment includes a handlebar 162 having handles that curve toward the user in the seated position. In other embodiments, the handlebar 162 may be straight or shaped otherwise. The brake level 174 may include a parking brake lock to prevent the vehicle 100 from unintentional rolling.

The vehicle 100 may also include first and second supports 176, 178 for carrying an item such as a golf bag 102. The first support 176 connected to the first and second front bars 116a, 116b may have a curved portion shaped to receive the curvature of the golf bag 102. The first support 176 may be connected to the first and second front bars 116a, 116b at further hinged connections 180a, 180b that cause the first support 176 to pivot between a functioning position shown in FIG. 1 when the vehicle 100 is in the active position and an idle position shown in FIG. 4 when the vehicle 100 is in the compact state. The second support 178 is connected to the cross bar 114 and may be curved to receive the golf bag 102 as shown in the illustrated embodiment. In some embodiments, the second support 178 extends from one of the support members 128 and/or the first and second spacer members 132a, 132b of the cross bar 114.

The vehicle 100 includes a seat 180 mounted within a seat tube 182 fixedly connected to the rear tube 118. The seat 180 may be removable from the seat tube 182. The height of the seat 180 may be adjustable. The vehicle may include suspension such as springs or shock absorbers on the seat 180 or the fork 166. Each of the first and second front wheels 104a, 104b and the rear wheel 106 may have a diameter of about 14 to 16 inches, although any size wheel may be used.

Example dimensions of the illustrated embodiment are provided in the table below, although the dimensions may vary as desired or necessary.

| Measurement | Dimension (in.) |
| --- | --- |
| Front wheel axle to center of rear wheel | 42 |
| Width between outer surfaces of front wheels | 26 |
| Diameter of wheels | 14 |
| Width of tires | 2 |
| Top surface of handlebar to bottom surface of wheel | 42 |
| Upper golf bag support to lower golf bag support | 33 |

With the vehicle 100 in the active position as shown in FIGS. 1 and 2, a user places the item to be carried such as a golf bag 102 on the first and second supports 176, 178 and pedals the vehicle 100. In the active position, the end 136 of the down tube 122 is received by the receiving mechanism 124 and locked into position. The first and second front bars 116a, 116b are positioned away from the rear bar 118, and the first support 176 for the golf bag 102 extends outwardly from the first and second front bars 116a, 116b in the functioning position.

When moving between the active and compact positions, the receiving mechanism 124 is unlocked and enables the first and second front bars 116a, 116b to pivot about the hinged connections 120 of the rear bar 118 such that the cross bar 114 moves toward the rear bar 118. The down tube 122 may move towards the hinged connection 120 of the rear tube 118.

When in the compact position, the user may easily store and carry the vehicle 100, or place the vehicle 100 in the trunk or back seat of a car. In the compact position illustrated in FIGS. 4 and 5, the end 136 of the down tube 122 is spaced from the receiving mechanism 124 and is positioned adjacent to the hinged connection 120 of the rear bar 118. The first and second front bars 116a, 116b pivot about the hinged connection 120 such that the cross bar 114 is positioned adjacent to the rear bar 118 near the back wheel 106. In the illustrated embodiment, the first support 176 for the golf bag 102 is positioned adjacent to the first and second front bars 116a, 116b in the idle position as shown in FIG. 4.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A passenger vehicle for carrying a golf bag comprising: first and second front wheels and a rear wheel;
a frame including a cross bar extending between the first and second front wheels, first and second front bars connected to a rear bar at a hinged connection, and a down tube connected to the cross bar, wherein the rear bar includes a receiving mechanism for releaseably receiving the down tube,
gearing including a cassette secured to an axle extending through the cross bar, a chain wheel secured to the down tube, and a crank set attached to the chain wheel;
a steering mechanism for providing directionality and including a steering member within the rear bar, a handlebar secured to a first end of the steering member, and a fork connected to a second end of the steering member opposite the first end and attached to the rear wheel; and
a first support connected to the first and second front bars and a second support connected to the cross bar and, wherein the golf bag is supported by the first and second supports;
wherein the frame may be folded into a compact position.

2. The vehicle of claim 1, wherein the steering mechanism further includes a reverse gear mechanism connected to the handlebar and the steering member for reversing the directionality of the steering.

3. The vehicle of claim 1, wherein the down tube is connected to the rear bar by the receiving mechanism in an active position.

4. The vehicle of claim 3, wherein the down tube comprises an opening at an end, wherein the receiving mechanism includes a rod on a plate extending from the rear tube, and wherein the opening of the down tube is positioned about the rod in the active position.

5. The vehicle of claim 4, wherein the receiving mechanism further includes a lock for preventing the rotation of the down tube about the axle.

6. The vehicle of claim 3, wherein the down tube is positioned adjacent to the first and second front bars in the compact position.

7. The vehicle of claim 1, wherein the second support is connected to the first and second front bars at further hinged connections.

8. The vehicle of claim 1, wherein cross bar comprises spaced first and second portions and a plurality of support members extending between the first and second portions, and wherein the cassette is positioned between the first and second portions of the cross bar.

9. A passenger vehicle movable between an active position and a compact position, comprising:
a frame including a cross bar, first and second front bars connected to a rear bar at a hinged connection, and a down tube connected to the cross bar;
first and second wheels secured to an axle extending through cross bar;
a third wheel connected to the rear bar;
a steering mechanism for providing directionality and including a steering member within the rear bar, a handlebar secured to a first end of the steering member, and a fork connected to a second end of the steering member opposite the first end and attached to the rear wheel; and
wherein a first end of the down tube is received by a receiving mechanism extending from the rear bar in the active position and is spaced from the receiving mechanism in the compact position; and wherein a second end of down tube is fixedly connected to the cross bar in the active and compact positions.

10. The vehicle of claim 9, wherein the down tube and cross bar rotate about the axle when moving between the active and compact positions.

11. The vehicle of claim 10, wherein the hinged connection enables the first and second front bars to pivot toward the rear bar when moving from the active position to the compact position.

12. The vehicle of claim 11, wherein the end of the down tube is positioned adjacent the hinged connection in the compact position.

13. The vehicle of claim 12, wherein the cross bar is positioned adjacent to the rear bar in the compact position.

14. The vehicle of claim 9, wherein the receiving mechanism enables the down tube to pivot about the axle towards the first and second front bars.

15. The vehicle of claim 9, further comprising a first support connected to the cross bar and a second support connected to the first and second front bars.

16. The vehicle of claim 15, wherein a golf bag is supported by the first and second supports in the active position.

17. The vehicle of claim 16, wherein the second support is connected to the first and second front bars at further hinged connections.

18. The vehicle of claim 17, wherein the second supports extend outwardly from the first and second front bars in the active position and are positioned adjacent to the first and second front bars in the compact position.

* * * * *